United States Patent
Frantzheld et al.

(10) Patent No.: US 10,173,865 B2
(45) Date of Patent: Jan. 8, 2019

(54) DECENTRALIZED LINEAR MOTOR REGULATION FOR TRANSPORT SYSTEMS

(71) Applicant: THYSSENKRUPP ELEVATOR AG, Essen (DE)

(72) Inventors: Jürgen Frantzheld, München (DE); Qinghua Zheng, München (DE); Friedrich Löser, Riemerling (DE)

(73) Assignee: THYSSENKRUPP ELEVATOR AG, Essen (DE)

( * ) Notice: Subject to any disclaimer, the term of this patent is extended or adjusted under 35 U.S.C. 154(b) by 0 days.

(21) Appl. No.: 14/911,692

(22) PCT Filed: Aug. 1, 2014

(86) PCT No.: PCT/EP2014/002120
§ 371 (c)(1),
(2) Date: Feb. 11, 2016

(87) PCT Pub. No.: WO2015/022056
PCT Pub. Date: Feb. 19, 2015

(65) Prior Publication Data
US 2016/0194182 A1 Jul. 7, 2016

(30) Foreign Application Priority Data
Aug. 13, 2013 (DE) .......................... 10 2013 108 767

(51) Int. Cl.
*H02K 7/14* (2006.01)
*G05B 11/00* (2006.01)
(Continued)

(52) U.S. Cl.
CPC ............ *B66B 25/003* (2013.01); *B66B 21/12* (2013.01); *B66B 23/02* (2013.01); *B66B 25/00* (2013.01);
(Continued)

(58) Field of Classification Search
CPC ........ B66B 25/003; B66B 21/12; B66B 23/03
(Continued)

(56) References Cited

U.S. PATENT DOCUMENTS

2005/0023107 A1 2/2005 Matheisl

FOREIGN PATENT DOCUMENTS

| CN | 1579917 A | 2/2005 |
| CN | 1712346 A | 12/2005 |

(Continued)

OTHER PUBLICATIONS

English language Abstract of CN 201080404 Y listed above.
(Continued)

*Primary Examiner* — Erick Glass
(74) *Attorney, Agent, or Firm* — thyssenkrupp North America, Inc.

(57) ABSTRACT

An example electromotive linear drive mechanism for moving walkways for conveying people or objects may comprise a long stator as an active primary part positioned along a direction of movement of a moving walkway, as well as a plurality of passive secondary parts that are movable with respect to the active primary part and are arranged with one another along the direction of movement. The long stator may have a plurality of successive long stator sections in the form of coil groups along the direction of movement. Each long stator section may have its own control device that is configured to move the secondary parts using control parameters stipulated for the respective long stator section. Further, example methods for operating the electromotive linear drive mechanism may involve predefining different movement profiles for the respective control devices for at least some of the long stator sections such that the secondary parts move along the long stator in a non-uniform manner.

12 Claims, 4 Drawing Sheets

(51) Int. Cl.
  *B66B 25/00* (2006.01)
  *B66B 21/12* (2006.01)
  *B66B 23/02* (2006.01)
  *H02K 16/00* (2006.01)
  *H02K 41/02* (2006.01)
  *H02P 6/00* (2016.01)

(52) U.S. Cl.
  CPC .............. *H02K 16/00* (2013.01); *H02K 41/02* (2013.01); *H02P 6/006* (2013.01)

(58) Field of Classification Search
  USPC ...................................................... 318/4, 687
  See application file for complete search history.

(56) References Cited

FOREIGN PATENT DOCUMENTS

| | | |
|---|---|---|
| CN | 201080404 Y | 7/2008 |
| CN | 202054520 U | 11/2011 |
| EP | 1253101 B1 | 10/2002 |
| EP | 1258447 B1 | 11/2002 |
| EP | 1300359 B1 | 4/2003 |
| EP | 1502891 B1 | 2/2005 |
| EP | 1582494 B1 | 10/2005 |
| EP | 1845428 A2 | 10/2007 |
| EP | 1939127 B1 | 7/2008 |
| EP | 1939128 A2 | 7/2008 |
| EP | 1939129 B1 | 7/2008 |
| EP | 1939130 B1 | 7/2008 |
| EP | 2161826 B1 | 3/2010 |
| ES | 2400373 A1 | 4/2013 |
| JP | U11988074003 | 5/1988 |
| JP | 2001-031353 A | 2/2001 |
| JP | 2001-097658 A | 4/2001 |
| JP | 2002-078107 A | 3/2002 |
| JP | 2013-032225 A | 2/2013 |
| WO | 2009132729 A2 | 11/2009 |
| WO | 2014/102019 A | 7/2014 |

OTHER PUBLICATIONS

English language Abstract of CN 202054520 U listed above.
English language Abstract of CN 1712346 A listed above.
"Comparison of Linear Synchronous and Induction Motors", U.S. Department of Transportation—Federal Transit Administration, Jun. 1, 2004.
Int'l Search Report for PCT/EP2014/002120 dated Oct. 21, 2014 (mailed Oct. 28, 2014).
English Language Abstract of EP1253101A1.
English Language Abstract of EP1258447A1.
English Language Abstract of EP1502891A1.
English Language Abstract of EP2161826.

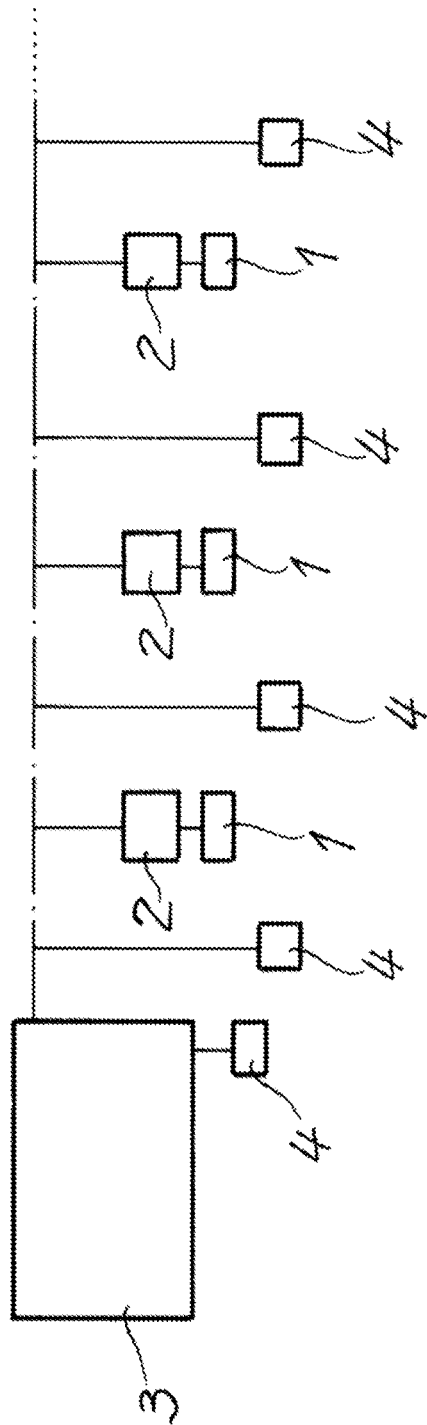

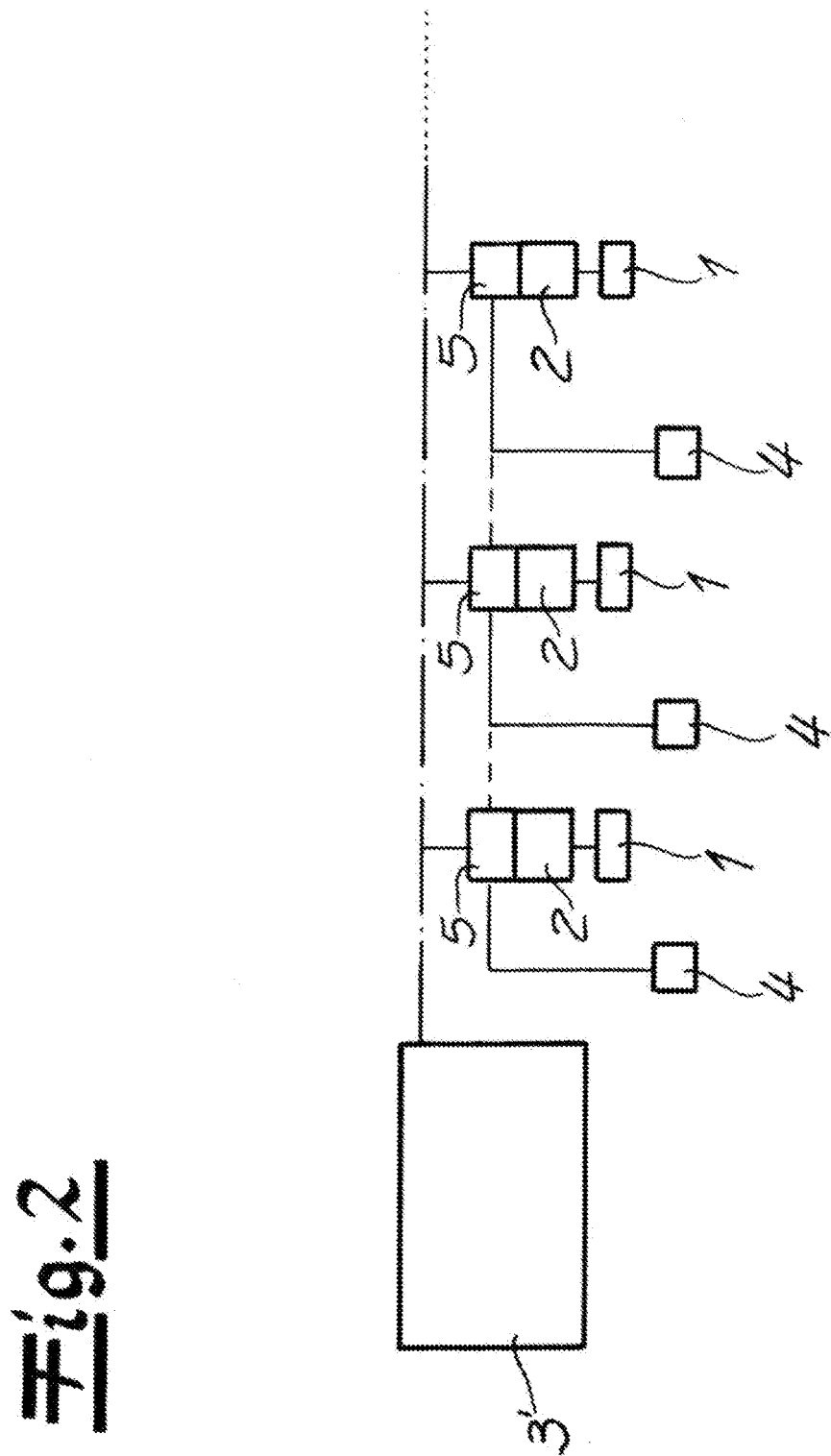

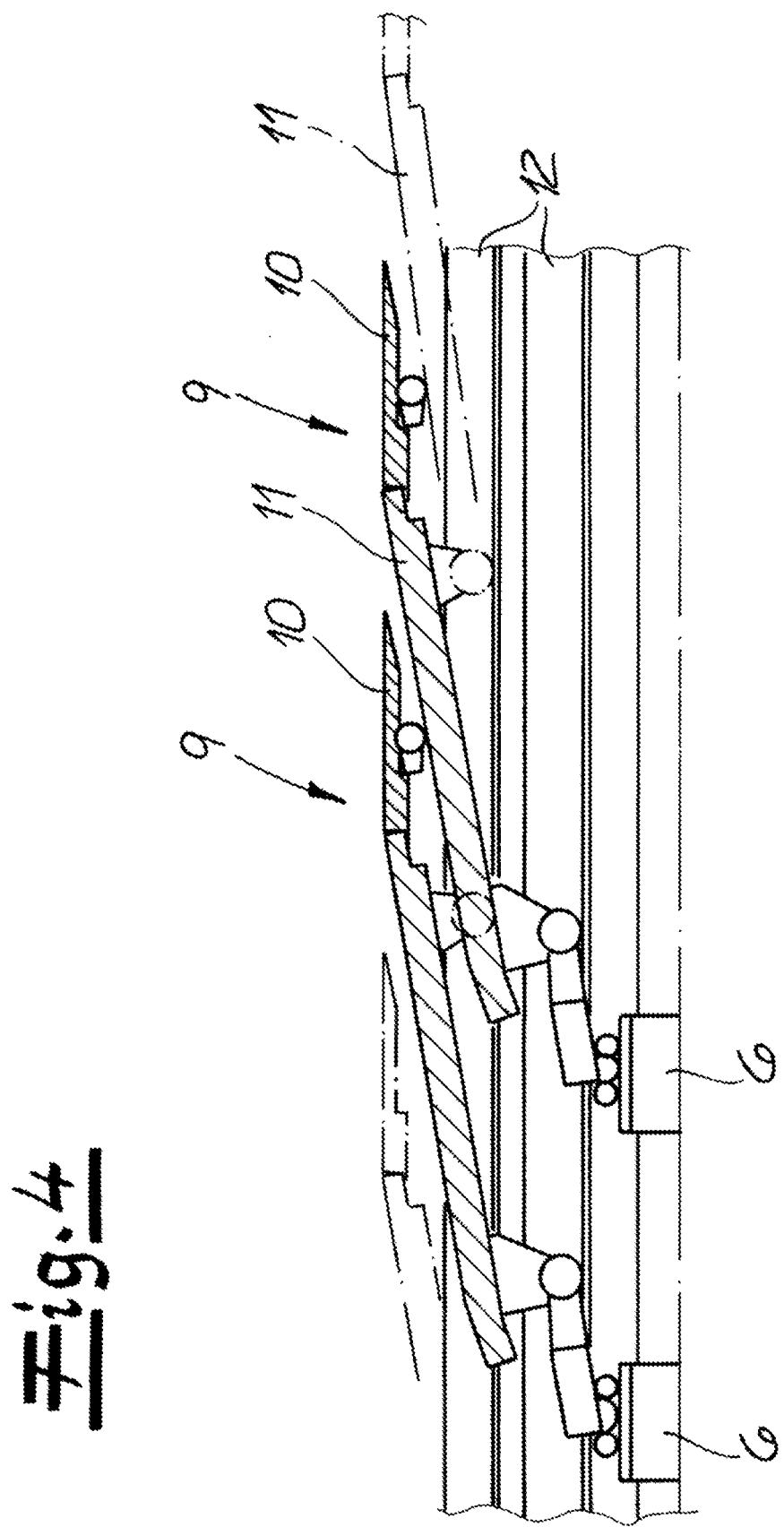

DECENTRALIZED LINEAR MOTOR REGULATION FOR TRANSPORT SYSTEMS

CROSS REFERENCE TO RELATED APPLICATIONS

This application is a U.S. National Stage Entry of International Patent Application Serial Number PCT/EP2014/002120, filed Aug. 1, 2014, which claims priority to German Patent Application No. DE 102013108767.1 filed Aug. 13, 2013, the entire contents of both of which are incorporated herein by reference.

FIELD

The present disclosure relates to electromotive linear drives and, more particularly, to electromotive linear drives for moving walkways and other devices for conveying people or objects.

BACKGROUND

Moving walkways which have a variable speed over their length in order to be able to bridge large distances in a relatively short time are known for the purpose of conveying persons. In order to make it possible for the persons to be conveyed to easily enter and exit, the ends of the moving walkway are moved at a first, lower speed. After the entry region, the moving walkway usually formed from individual moving walkway plates accelerates to a second, higher transport speed before the deceleration to a lower speed, for example the first speed, is carried out in an exit region. In practice, a speed of 0.6 m/s, for example, may be provided for the entry and exit regions, whereas the second, higher speed is 2 m/s.

In order to enable the described change in the speed along the length of the moving walkway, the moving walkway plates must be able to be moved in a telescope-like manner with respect to one another. In order to enable driving at different speeds and an acceleration, it is known practice to drive the moving walkway plates in the entry and exit regions with a worm which has a variable pitch. Such a worm is then used to accelerate the moving walkway plates to the second speed and to decelerate them from the second speed, a chain which moves at the higher, second speed being provided between the worms.

Mechanically driven moving walkways with a variable speed are known from EP 1 253 101 B1, EP 1 300 359 B1, EP 1 582 494 B1, EP 1 939 127 B1, EP 1 939 128 A2, EP 1 939 129 B1 and EP 1 939 130 B1. Even if the moving walkways described have proved themselves in practice, there is a need to simplify the design. In particular, the mechanical drive necessitates a relatively complicated configuration, in which case an amount of maintenance which is conventional for mechanical drives also arises.

EP 1 258 447 B1 and EP 1 502 891 B1 disclose drive arrangements and, in particular, moving walkways in which individual tread bodies in the form of moving walkway steps or moving walkway plates are provided with their own electromotive drive. This initially results in the advantage that it is possible to dispense with a central drive train in the form of a circulating chain or the like. Furthermore, EP 1 258 447 B1 also proposes moving the moving walkway plates with an increased speed on a return transport path, with the result that the number of moving walkway plates can be reduced overall. However, equipping the moving walkway plates with their own electric motor is associated with a considerable amount of effort overall.

EP 1 845 428 A2 discloses an electromotive linear drive arrangement in which the secondary parts are each equipped with two permanent magnets which interact with different primary parts or primary sections. The two magnets with the respectively assigned primary part form two linear motors which are separate from one another. The movement is therefore transferred from one linear motor to the other at transition points. The linear motors formed in this manner are only alternately active. A sensor can be used to determine the position of the pallet equipped with the two permanent magnets.

EP 2 161 826 B1 discloses a transfer apparatus having dynamically changeable drive regions. The primary part is subdivided into a plurality of regions each with a secondary part. The region boundaries of this division are dynamically concomitantly moved with the secondary parts, the individual secondary parts being able to be moved with a predefined movement profile. Successive secondary parts can be moved in this case in an exactly identical manner or else differently with respect to one another.

BRIEF DESCRIPTION OF THE FIGURES

FIG. 1 is a schematic view of a prior art electromotive linear drive mechanism.

FIG. 2 is a schematic view of an example linear drive mechanism according to the present disclosure.

FIG. 4 is a cross-section side view of example plates of an example moving walkway for conveying people.

DETAILED DESCRIPTION

Figure 3A:
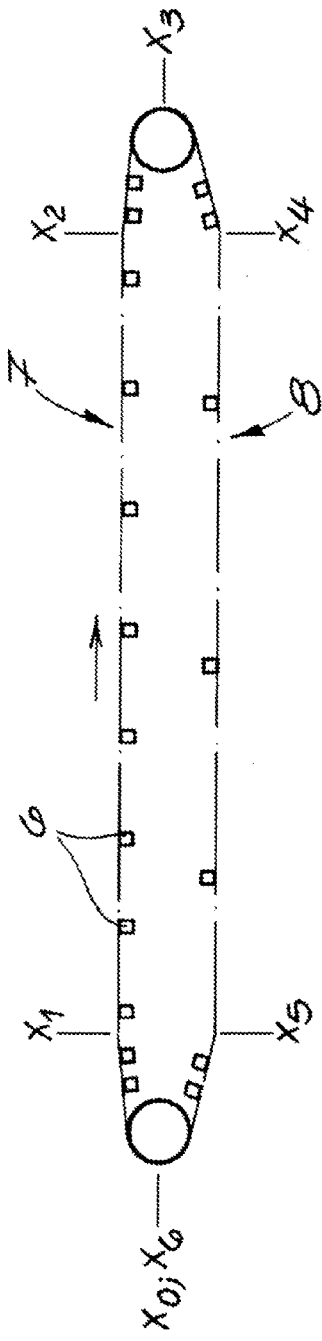
FIG. 3A is a schematic view of an example moving walkway for conveying people with an example electromotive linear drive mechanism.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns electromotive linear drive mechanisms or, alternatively, arrangements, which may be utilized in moving walkways and other devices for conveying people or objects. In some examples, the electromotive linear drive mechanism may comprise a long stator positioned along a direction of movement as an active primary part, a plurality of passive secondary parts that are movable with respect to the primary part and are arranged behind one another along the direction of movement. The long stator may in some cases have a multiplicity of successive long stator sections in the form of coil groups positioned along the direction of movement. The present disclosure also concerns methods for operating electromotive linear drive mechanisms for moving the secondary parts in a non-uniform manner.

More particularly, some example linear drive mechanisms may have coil groups arranged behind one another in a stationary manner positioned along the direction of movement as active primary parts and a plurality of movable secondary parts in the form of permanent magnets. The stationary coil groups may be supplied in sections using a plurality of converters, while the position of the secondary parts, the feed forces, and the motor currents in the coil groups may be controlled by a central regulator via the corresponding converters. In some examples, absolute sensors may be used to detect positions. For instance, purpose markings such as magnetic strips, for example, may be arranged on secondary parts for detection by stationary sensors along the direction of movement. Central control of all long stator sections of the primary part can be used to move the secondary parts in a variable way in a manner matched to one another.

The present invention is based on the object of specifying an electromotive linear drive arrangement and a method for operating the electromotive linear drive arrangement which enable a simple technical configuration and are suitable, in particular, for moving walkways for conveying persons or objects.

Furthermore, each long stator section in some example electromotive linear drive mechanisms may have its own control device for controlling the movement of the secondary part, the control device being set up to move the secondary part using control parameters stipulated for the respective long stator section.

Within the scope of the invention, the secondary parts are therefore controlled in a decentralized manner. Each long stator section can therefore be autonomously operated, a predefined movement profile for the secondary parts being stored in an assigned memory for each control device. Central control of the long stator sections and therefore central control of the coil groups for the different long stator sections are therefore dispensed with. Instead, the entire long stator is divided into stationary long stator sections each with an assigned converter each having their own control device. As soon as a secondary part reaches this long stator section, this secondary part is autonomously moved by the assigned control device using a stored movement profile.

Within the scope of the invention, provision is preferably made in this case for the successive secondary parts to be moved in the same manner or at least according to the same specifications in each long stator section, different movement speeds being able to be provided along the entire long stator. For example, acceleration and deceleration sections or else regions with a constant movement speed can be implemented in individual long stator sections.

As described above, the individual secondary parts are moved in the long stator sections by the assigned control device. In this case, provision may optionally be made for immediately adjacent motor sections to communicate with one another in order to make it possible to directly, smoothly transfer the secondary parts. Immediately adjacent long stator sections may communicate with one another in a master/slave mode, for example, coordinated control being carried out if the secondary part is at a junction of two successive long stator sections.

Within the scope of the invention, a fixed local assignment of the long stator sections is carried out, with the result that complicated dynamic regulation and assignment are dispensed with. Apart from communication between immediately successive long stator sections, the individual long stator sections operate autonomously. The controller of the individual long stator sections may be set up to monitor and adjust the position, the speed and the feed force of the individual secondary parts.

Different possibilities emerge for the specific configuration of the long stator sections. Provision may be made for the number of long stator sections to be greater than the number of secondary parts. A high degree of flexibility is achieved by finely subdividing the long stator into short long stator sections. If the length for all long stator sections is also shorter than the distance between successive secondary parts in this case, secondary parts are also guided only for some of the long stator sections. Changes in the movement characteristic on the basis of corresponding programming are readily possible in a wide range in this case.

However, it is often the case that the movement profile to be implemented subsequently is at least already known, for instance, when arranging the long stator sections. If the linear drive arrangement is provided, for example, for a moving walkway for conveying persons or objects, end regions of the moving walkway are provided as an acceleration or deceleration section, whereas a high advance speed is expedient in a middle section of the moving walkway. It may therefore be expedient to configure the long stator sections with a different length according to the respective requirements. If, for example, the secondary parts pass through a region at a high speed, a longer length of the long stator sections may also be expediently provided there. The longer length then also takes into account the fact that a larger distance is covered during faster movement per unit time.

In addition, within the scope of the invention, it is also not necessary for only precisely one secondary part to be guided in each long stator section during operation. In principle, it is also possible for two secondary parts or a plurality of secondary parts to be simultaneously moved by the assigned control device in a long stator section. A plurality of secondary parts can be easily guided in a long stator section, in particular, when no significant deceleration or acceleration is provided in the respective long stator section during operation. In the case of a moving walkway for conveying persons or objects, a central section between an entry region and an exit region can be bridged by a long long stator section or by a plurality of long stator sections with a comparatively long length, for example.

In this case, at least one sensor for detecting the state of the secondary parts is respectively expediently connected to the control device. In the simplest case, a sensor for determining the position is provided for each control device. Absolute sensors for detecting the position can be implemented, for example, by combining incremental encoders and contactless proximity switches. Such an absolute sensor can also generate a direction-dependent reference index when traveled over. The secondary parts may also be equipped with a device for continuously determining the position, for example a magnetic strip. The feed force needed to move the secondary parts can be determined in a known manner by measuring the coil currents or voltages.

Within the scope of the invention, the control devices can be connected to a central controller which, however, in contrast to the configurations known from the prior art, does not control the entire movement sequence and the control of the converters.

In order to be able to change the entire movement sequence of the electromotive linear drive arrangement, a central controller can interact with the control devices of the individual long stator sections in such a manner that a clock signal is used to synchronize the control devices. The movement profile stored for each controller is then adapted to the clock signal as a time reference. If the clock frequency is changed, provision is intended to be made, in particular, for the speed of the secondary parts to be changed in a proportional manner in each long stator section. The clock signal can therefore be used to globally change the speed of the secondary parts along the long stator.

In addition, the central controller can also use a corresponding connection to transmit a start signal, a stop signal or a signal for changing the operating mode. For example, different movement profiles for different operating modes may be stored for each of the control devices, all control devices then simultaneously changing to a different operating mode in the event of a corresponding signal from the central controller. Since the parameters for the respective operating mode have already been stored for each control device, such a change can be carried out particularly easily and quickly. Synchronization with a clock signal can be carried out, for example, by means of a field bus system such as EtherCAT. In this case, it should be taken into account that the individual long stator sections—apart from an only optionally provided master/slave mode of immediately successive long stator sections—do not require a state variable or status information relating to other long stator sections.

As described above, one preferred configuration of the invention provides for a predefined movement profile for the secondary parts to be stored in an assigned memory for each control device. This memory is preferably provided directly on the control device or as an integral part of the control device, with the result that signal transmission from the individual control devices to a remotely arranged memory can be dispensed with.

As customary, the term "long stator" relates to the constructional configuration of the electromotive linear drive arrangement. It goes without saying that the invention is not restricted to a straight direction of movement. Curves, bends, downhill sections, inclines or the like may also be provided, in particular, along the direction of movement. In particular, the long stator may form a closed movement circuit for the secondary parts. If the electromotive linear drive arrangement is part of a moving walkway for conveying persons, for example, the persons are moved from a starting point to an end point, in which case the secondary parts must then return to the starting position again.

Since the mechanical construction is simplified within the scope of the invention by dispensing with a central drive apparatus in the form of a chain or the like, a moving walkway with sections running in the opposite direction can also be achieved in a particularly simple manner using the electromotive linear drive arrangement, both sections being intended to convey persons. The individual secondary parts must then only be transferred in a suitable manner between the sections.

If the secondary parts are moved and therefore returned only between an end point and a starting point for the purpose of conveying persons or objects, driving at a maximum speed can also be carried out in order to bridge this return region as quickly as possible and with as few secondary parts as possible.

The secondary parts or the elements driven by the secondary parts in the form of moving walkway plates may be mechanically guided close to one another and/or mechanically coupled to one another at least between a starting point and an end point for conveying persons or objects. Such mechanical coupling also makes it possible to avoid intermediate spaces being able to form between two successive moving walkway pallets in the event of a malfunction of the linear drive arrangement. However, such a mechanical connection can be abolished if the secondary parts or the elements driven thereby in the form of moving walkway plates are moved between the end point and the starting point without a person to be conveyed or an object to be conveyed. In particular, within the scope of the invention, individual secondary parts can also be removed or added during operation. For example, it is also possible to replace individual secondary parts during operation for maintenance purposes.

The present invention is directed, in particular, to the use of the described linear drive arrangement for moving walkways for conveying persons or objects.

The invention also relates to a method for operating the described electromotive linear drive arrangement, different movement profiles being predefined to the respective controllers for at least some of the long stator sections for the purpose of moving the secondary parts in a non-uniform manner along the long stator. As described above, an average speed of the secondary parts along the long stator may preferably be changed in this case by means of the frequency of the clock signal from a central controller.

The long stator sections preferably autonomously control the assigned secondary part, except for optionally taking into account the clock signal, a matching movement sequence being able to be provided in each long stator section for the successive secondary parts there.

FIG. 1 shows an electromotive linear drive arrangement according to the prior art which is known from practice and has a long stator which runs along a direction of movement and has individual long stator sections 1 in the form of coil groups.

A converter 2 for controlling the coils of the respective long stator section 1 is respectively upstream of the stationary long stator sections 1. All of the converters 2 are controlled by a central controller 3 in order to move a plurality of secondary parts (not illustrated in FIG. 1) in the form of permanent magnets 6 along the long stator formed by the long stator sections 1 according to a predefined movement profile. Sensors 4, the signals from which are processed by the central controller 3, are also arranged along the long stator.

A relatively complicated connection results overall, in which case control signals are continuously passed from the central controller 3 to the individual converters during operation of the electromotive linear drive arrangement. The entire signal processing, including safety logic, is carried out in the central controller 3, in which case the exact movement profiles of the secondary parts along the long stator are also stored there.

In contrast, FIG. 2 shows a configuration according to the invention of the electromotive linear drive arrangement, in which case a separate control device 5 for controlling the movement of the secondary parts is provided for each long stator section 1. The control devices 5 each comprise a memory which stores the movement profile provided for the respective path section.

In order to move the secondary parts along the respective long stator section 1, movement is controlled solely by the assigned control device 5 which operates in a largely autonomous manner. The sensors 4 likewise provided according to FIG. 2 are each connected to an assigned control device 5 and are not connected to a central controller 3'. The central controller 3' is provided only for the purpose of synchronizing the control devices 5 for each long stator section using a clock signal. In addition, the central controller 3' can also transmit a start signal, a stop signal or a signal for changing the operating mode. The transmission of further data is neither necessary nor provided, thus resulting in a considerable simplification as a result of the control being decentralized. In particular, it is not necessary to centrally monitor the entire movement sequence of the individual secondary parts over the long stator.

FIG. 2 indicates that the immediately successive control devices 5 can optionally be connected to one another in order to facilitate transfer of the secondary parts from long stator section 1 to long stator section 1.

FIG. 3A shows a highly schematic illustration of the use of an electromotive linear drive arrangement according to the invention on a moving walkway for conveying persons, in which case only the positions of the secondary parts in the form of permanent magnets 6 along the entire direction of movement are indicated.

The long stator forms a closed movement circuit for the secondary parts, with an upper run 7 and a lower run 8. Moving walkway plates 9 (FIG. 4) which are movable with respect to one another are arranged on the individual permanent magnets 6 as secondary parts.

In an entry region between the points $X_0$ and $X_1$, the permanent magnets 6 as secondary parts and therefore the moving walkway plates 9 fastened thereto are accelerated from a low speed, which enables persons to get on, to a continuous transport speed. The moving walkway plates move between the points $X_1$ and $X_2$ at this transport speed. In order to then make it possible for a passenger to get off the indicated moving walkway, deceleration is carried out between the points $X_2$ and $X_3$.

In order to then move the individual secondary parts with the permanent magnet 6 and the moving walkway plate 9 back to the entry region, these parts are moved at a high speed between the points $X_4$ and $X_5$ in the lower run 8, as a result of which this distance can be quickly bridged with a few elements. The secondary parts then pass to the starting point $X_0$ again and are therefore guided in a circuit at a variable speed.

Figure 3B:
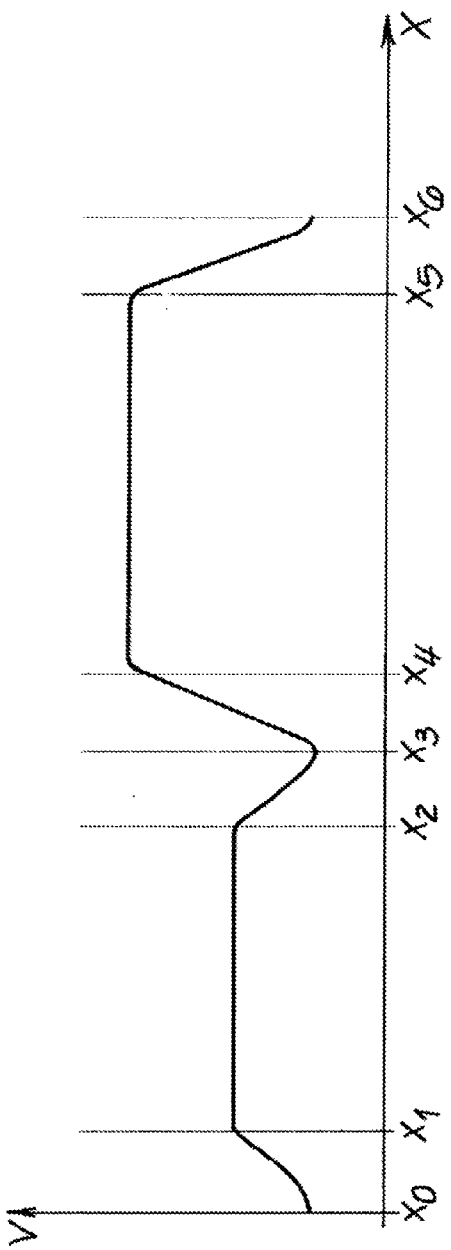
FIG. 3B is a diagram of a speed profile of movement of secondary parts at multiple locations along the example moving walkway of FIG. 3A.

FIG. 3B shows, by way of example, a possible speed profile along the entire route.

FIG. 4 shows a possible configuration of moving walkway plates 9 of a moving walkway for conveying persons. The moving walkway plates 9 are movable with respect to one another, the moving walkway plates 9 being pushed together at a slow advance speed and only an end section 10 being exposed. If the speed is increased, a telescopic section 11 of the moving walkway plates 9 is then gradually released, as a result of which the effective length of the individual moving walkway plates 9 is accordingly increased. The moving walkway plates 9 are laterally guided in rails 12 and are preferably also anchored to one another in the tensile direction at least on the upper run 7. The individual moving walkway plates 9 are also connected to a permanent magnet 6 as a secondary part of the electromotive linear drive arrangement. As described above, provision may be made on the lower run 8 for the moving walkway plates 9 to be able to be completely decoupled from one another for faster movement. FIG. 4 also shows, as explained above, how an example long stator 18 may include the stator sections 1 with coil groups 20.

What is claimed is:

1. An electromotive linear drive mechanism for moving walkways for conveying people or objects, the electromotive linear drive mechanism comprising:
a long stator positioned along a direction of movement of a moving walkway, wherein the long stator is an active primary part and comprises a plurality of successive long stator sections configured as coil groups, with the plurality of successive long stator sections being arranged along the direction of movement;
a plurality of passive secondary parts that are movable with respect to the active primary part and are configured behind one another along the direction of movement; and
a control device for each of the plurality of successive long stator sections, wherein each control device controls movement of the plurality of passive secondary parts according to control parameters of each respective long stator section, wherein the control devices of the plurality of successive long stator sections are connected to a central controller that uses a clock signal to synchronize the control devices, wherein the central controller changes an average speed of the plurality of passive secondary parts along the long stator by changing a frequency of the clock signal.

2. The electromotive linear drive mechanism of claim 1 wherein each control device comprises a memory, wherein each control device stores a predefined movement profile for the plurality of passive secondary parts in the memory.

3. The electromotive linear drive mechanism of claim 2 wherein at least two of the predefined movement profiles are different such that the plurality of passive secondary parts move along the long stator in a non-uniform manner.

4. The electromotive linear drive mechanism of claim 1 wherein aside from the clock signal from the central controller each control device autonomously controls the plurality of passive secondary parts that correspond to the respective long stator section.

5. The electromotive linear drive mechanism of claim 1 wherein a quantity of the plurality of successive long stator sections is greater than a quantity of the plurality of passive secondary parts.

6. The electromotive linear drive mechanism of claim 1 wherein the long stator forms a closed movement circuit for the plurality of passive secondary parts.

7. The electromotive linear drive mechanism of claim 1 wherein each of the plurality of successive long stator sections comprises a plurality of coils and a converter for controlling the plurality of coils.

8. The electromotive linear drive mechanism of claim 1 wherein the plurality of passive secondary parts comprises permanent magnets.

9. The electromotive linear drive mechanism of claim 1 further comprising at least one sensor for detecting a state of the plurality of passive secondary parts, wherein the at least one sensor is connected to the control devices.

10. A method of operating an electromotive linear drive mechanism comprising a long stator positioned along a direction of movement of a moving walkway, wherein the long stator is an active primary part and comprises a plurality of successive long stator sections configured as coil groups, a plurality of passive secondary parts that are movable with respect to the active primary part and are configured behind one another along the direction of movement, and a control device for each of the plurality of successive long stator sections, wherein each control device controls movement of the plurality of passive secondary parts according to control parameters of each respective long stator section, the method comprising:
predefining and assigning movement profiles to the control devices for at least some of the plurality of successive long stator sections, wherein at least two of the movement profiles are different such that the plurality of passive secondary parts move along the long stator in a non-uniform manner; and changing an average speed of the plurality of passive secondary parts along the long stator by changing a frequency of a clock signal from a central controller.

11. The method of claim 10 further comprising moving the plurality of passive secondary parts along the long stator in a matching movement sequence.

12. The method of claim 10 further comprising changing a quantity of the plurality of passive secondary parts.

* * * * *